Figure 3:
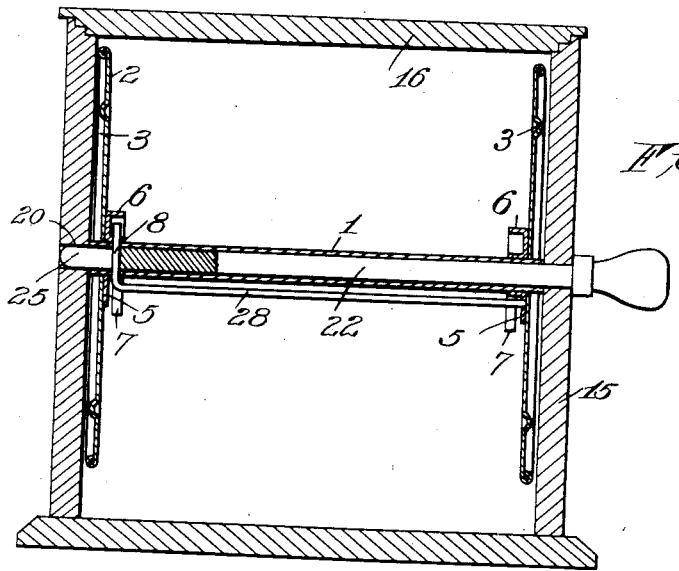

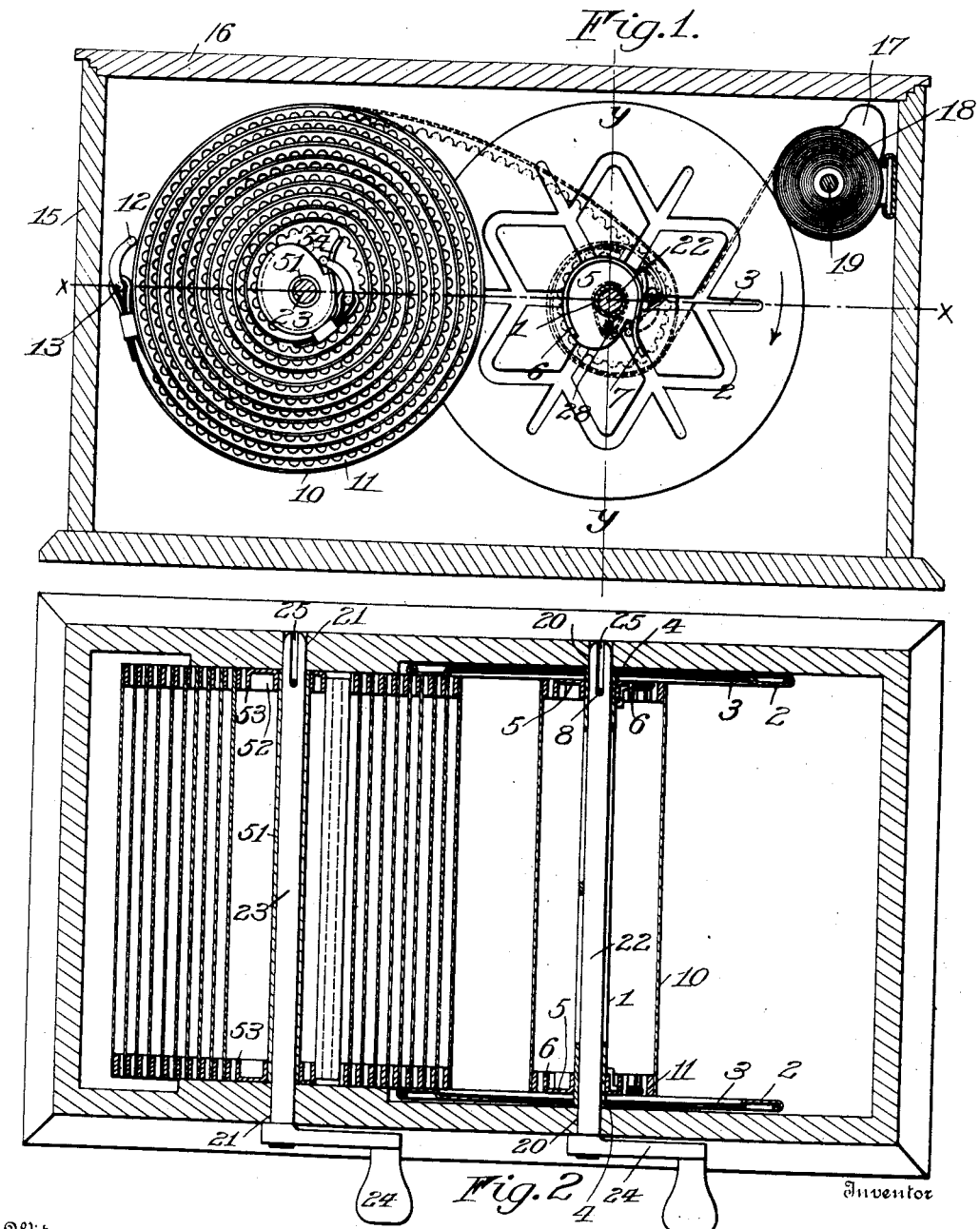

No. 866,321. PATENTED SEPT. 17, 1907.
F. W. BARNES.
PHOTOGRAPHIC DEVELOPING APPARATUS.
APPLICATION FILED APR. 1, 1905.

3 SHEETS—SHEET 2.

No. 866,321. PATENTED SEPT. 17, 1907.
F. W. BARNES.
PHOTOGRAPHIC DEVELOPING APPARATUS.
APPLICATION FILED APR. 1, 1905.

3 SHEETS—SHEET 3.

Witnesses
Walter B. Payne
F. Willard Rich

Inventor
Frederick W. Barnes
By Frederick S. Church
his Attorney

UNITED STATES PATENT OFFICE.

FREDERICK W. BARNES, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC DEVELOPING APPARATUS

No. 866,321.　　　Specification of Letters Patent.　　　Patented Sept. 17, 1907.

Application filed April 1, 1905. Serial No. 253,319.

*To all whom it may concern:*

Be it known that I, FREDERICK W. BARNES, of Rochester, in the county of Monroe and State of New York, have invented certain new and useful Improvements in Photographic Developing Apparatus; and I do hereby declare the following to be a full, clear, and exact description of the same, reference being had to the accompanying drawings, forming a part of this specification, and to the reference numerals marked thereon.

My present invention relates to apparatus for developing photographic films and particularly film cartridges embodying a strip of flexible sensitized film and covering strips of flexible opaque material as black paper at the ends of the film at least, and also that form of cartridge in which the paper is longer than the film and moves with it, the ends extending beyond the latter to cover it when wound in a coil, and it has for its object to provide an apparatus simple and cheap in construction and by the use of which the operator may, without resort to the dark room, place the film in condition for subjection to the action of the necessary fluids and then deposit it in a suitable receptacle containing the developing, washing or fixing solution, allowing it to remain therein for as long time as may be necessary to accomplish the desired result.

In carrying out my invention I provide a portable spool or reel having flanges at the ends which are light proof but permeable by fluids and upon which the film is wound in separated convolutions to permit the free passage of the fluids to all portions thereof, but preventing the access of light to the film, and further I provide means by which the operation of applying the film cartridge to the spool or reel described, may be accomplished without the necessity of the operator's retiring to a dark room for the purpose.

The invention further consists in certain devices and constructions hereinafter fully described, the novel features being pointed out in the claims.

Figure 4:
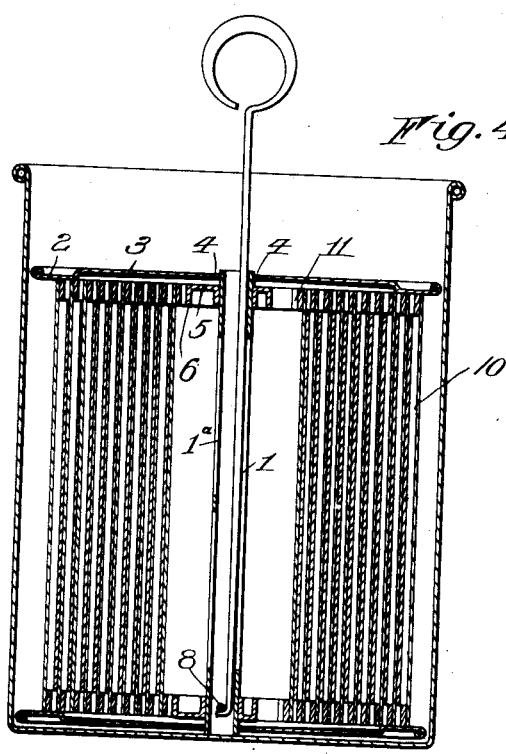
Figure 5:
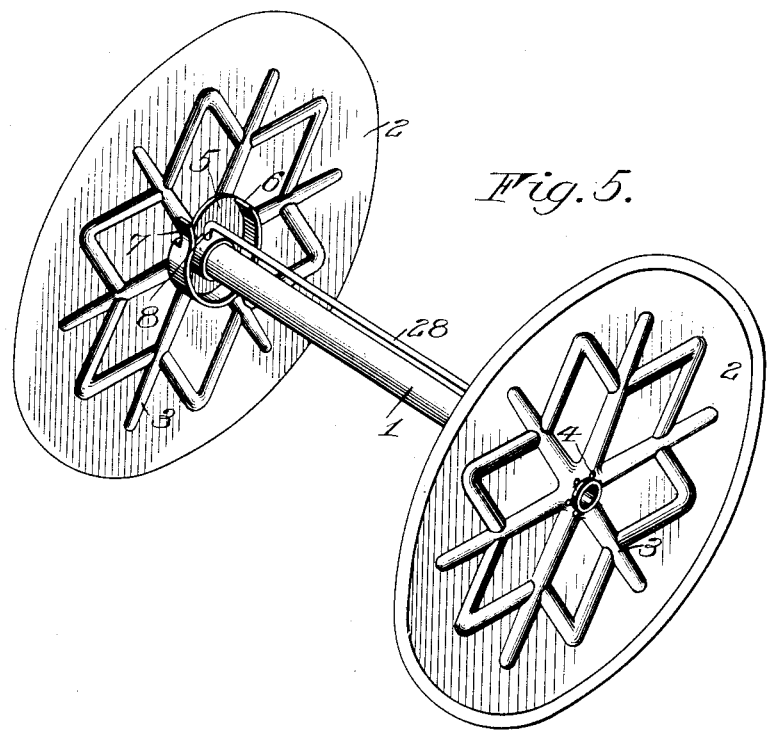
Figure 6:
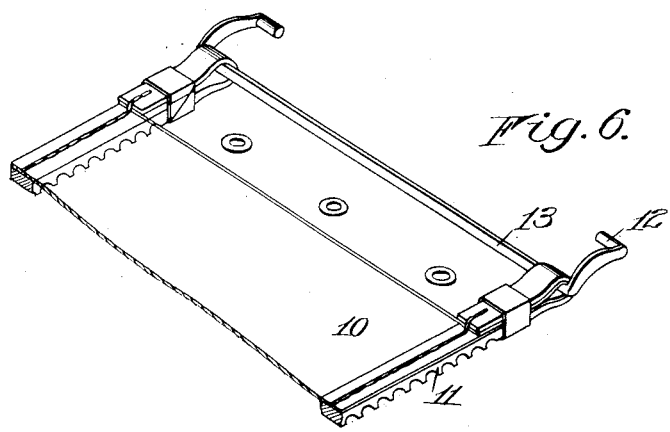

In the drawings: Figure 1 is a longitudinal sectional view of the devices for applying the film cartridge to the removable reel. Fig. 2 is a horizontal sectional view of the same taken on the line $x$—$x$ of Fig. 1. Fig. 3 is a vertical sectional view taken on the line $y$—$y$ of Fig. 1 with the film supporting apron removed. Fig. 4 is a vertical sectional view of the reel with the film thereon contained in a fluid receptacle for development. Fig. 5 is a perspective view of the reel, and Fig. 6 is a similar view of one end of the apron.

Similar reference numerals in the several figures indicate similar parts.

The reel or spool which constitutes one of the principal features of my invention is shown in Fig. 5, and consists generally of a tubular arbor 1, open at the ends, and having slots or apertures $1^a$ extending a considerable portion of its length, to the ends of which arbor are attached annular disks or flanges 2, preferably formed of sheet metal and provided with passages or channels which permit the passage of fluids or liquids, but prevent the passage of light from the outer sides of the disks or flanges to the inside of the spool. In the present embodiment these passages are formed by providing the disks with raised ribs 3 or corrugations on their outer sides extending radially from the arbor, and provided at their ends nearest the shaft with small apertures 4.

Secured to the arbor just inside the flanges and extending radially beyond the apertures 4, are plates 5 provided with inwardly projecting central collars and having the inwardly-extending flanges 6, said plates being cut away at one side and the flanges extending outwardly to form curved hooks or projections 7 at the base of which the plates are recessed as shown, for the reception of hooks on the apron, as will be described. The flanges on the plates 5 constitute supports for holding said apron a short distance from the arbor, forming an annular chamber communicating with the interior of the arbor for the passage of the developing washing or fixing liquids.

Arranged within the arbor near one end is a cross pin 8 serving as a means for manipulating the spool in the apparatus to be described, said pin 8 being formed by the laterally-projecting end of a bail or rod 28, extending parallel with the arbor 1 and having one end secured to one of the plates 5, and the portion constituting the pin 8 passing through the collar on one of the plates 5 and securing the parts firmly together, this bail 28 serving for the attachment for the end of the paper covering for the film cartridge.

The means for holding separated the layers or convolutions of film wound upon the arbor of the spool or container embodies strips 11 of flexible material as rubber, having in their under sides a series of notches or grooves preferably formed by corrugating them, said strips being connected and held apart and against the spool flanges when in use by a wide strip 10 of flexible material such as celluloid which is unaffected by the fluids employed, the whole forming what I term an apron, but the feature of which is that it holds the film in separated layers and yet permits the liquids to come in contact with all parts of the film when submerged therein by entering the portions of the apron through the interstices or apertures formed by the notches or grooves when the strips 11 engage the adjacent underlying portions of the apron. At the ends of the apron are provided hooks, preferably formed by extending inwardly the ends 12 of a bail 13 extending through loops at the ends of the apron, as shown in Fig. 6, said hooks 12 being adapted to coöperate with the hooks or projections 7 on the plates 5, when the apron and film are wound upon the carrier.

The manner of using the film carrier and apron for the development of film cartridges—that is, rolls of film, provided with a covering of opaque paper rolled in a spiral with the film, and having the covering ends extending beyond the ends of the film, or merely covering strips of black paper attached to the ends of the film, will be apparent from an examination of the accompanying drawing, the necessary appliances consisting merely of a light-tight box or casing containing means for holding the exposed film cartridge, the spool or container and an arbor for the apron.

In the form shown 15 indicates a suitable box or receptacle having a removable lid or cover 16 fitted to it and having near its upper portion suitable holders indicated by 17 for holding the film cartridge 18 in such manner that the film and paper may be readily unwound from the spool or spindle 19 on which it is contained.

In the sides of the receptacle 15 are formed apertures 20 and 21 at two separated points, and preferably in the same horizontal plane, forming bearings for the removable spindles 22 and 23, each provided at one end with a crank or handle 24 and slotted as at 25 at the opposite end for engagement with the cross pin of the arbor of the spool, and a similar pin in the arbor carrying the apron.

Mounted upon the spindle 23 is a tubular shaft 51 having at the ends plates 52 provided with inwardly-extending flanges 53 having the hooks 54 thereon, these parts being similar in construction to the arbor, and plates on the spool, as described, and the apron is wound by the rotation of the spindle 23 upon this arbor, as shown in Figs. 1 and 2, the hooks or projections at the inner end of the apron being engaged by the projections 54, and the hooks at the outer end being free for application to the hooks 7 on the spool.

In using the apparatus the apron is arranged upon the arbor 51, as shown, and the spool is centered upon the spindle 22. The operator then while the cover is removed and when the exposed cartridge is held, as shown inserts the outer end of the flexible covering of the film cartridge beneath the rod or bail 28 on the spool arbor, and then gives one or more turns to the spindle 22, winding a small portion of the paper around the arbor, but not exposing the film. He then places the end of the apron upon the flanges 6 of the spool and turns the spindle 22 still further, until the hooks 7 engage the inwardly extending ends 12 of the bail 13 at the end of the apron, all these operations being conducted in daylight and the film being effectually covered on the spool or cartridge 18 by the black paper. He then replaces the cover 16 on the receptacle and continues to turn the spool in the direction of the arrow in Fig. 1, winding the apron and the film and paper upon the spool in successive convolutions, the strips at the edge of the apron holding the film in separated layers. When the film and apron have been completely wound upon the spool or container, and the last convolution of the black paper at the end of the film have covered the film and apron, he removes the cover 16 of the receptacle and takes out the spool or container on which the film and apron are wound.

The flanges of the spool effectually cover and protect the film at the edges, and the paper (or the apron alone, if of opaque material,) prevents the passage of the light from the outer surface. This spool may now be handled in daylight, and at the convenience of the operator it is then introduced endwise into a suitable vessel, preferably cylindrical, containing the developing washing or fixing liquid, such for instance as shown in Fig. 4. As the spool is introduced liquid passes up through the convolutions of the apron, and the air and liquid, contained in the convolutions pass upwardly through the apertures formed in or by the corrugated strips, until the film is covered, the channels in the flanges of the spool and the small apertures 4 at the ends of these channels, permitting the outward passage of air, and liquid discharged against the flanges through the corrugations in the strips 11 on the apron thus allowing every part of the film to be subjected to the action of the liquid and preventing the accumulation of air which might prevent this. After having been permitted to remain in the liquid for a sufficient length of time, the spool is removed and the washing and fixing operations are accomplished in the same manner, the same or a different receptacle being employed for this purpose. After the image is fixed, the apron and film are unwound from the spool and dried, as usual and the apron is then, if desired, wound upon its arbor 51 and the latter returned to the receptacle or casing 15 for use in the development of other cartridges.

The method of procedure described herein, differs from that incident to the use of the ordinary developing machine, in that the film and apron are removed bodily from the apparatus in which the cartridge is unwound, and the film is treated in the separate receptacle, it having been found that the agitation of the film in the solutions is not necessary, provided the film is totally submerged in the fluids, and all air bubbles permitted to escape, which latter results I am enabled to accomplish by the employment of the light-proof but liquid-permeable flanges on the spool and the permeable strips 11 on the apron.

It will be understood that the term "film cartridge" used herein, is intended to mean simply a package or roll of film having covering strips at its end, permitting its introduction to or removal from a suitable holder in daylight, and its manipulation in a developing machine or device of this character in daylight, whether or not every convolution is covered by a flexible protecting medium; that is, film cartridges such as shown in the Turner patent No. 539,713, may be developed by it, as well as those shown in the McCurdy patents No. 647,900 or 647,901.

I claim as my invention:

1. A spool for use in the development of photographic film consisting of an arbor having flanges and light-tight fluid passages therein.

2. A spool for use in the development of photographic film consisting of an arbor provided with flanges at the ends having light-tight fluid passages therein, and means for attaching a film covering to said arbor.

3. A spool for use in the development of photographic film consisting of an arbor having the plates near the ends provided with hooks or attaching devices and annular flanges arranged beyond said plates having apertures near their inner portions.

4. A spool for use in the development of photographic film consisting of an arbor having the means for attachment of a film covering and flanges at the ends of said arbor provided with radial corrugations and apertures and covering devices for preventing the passage of light to the film.

5. A spool or container for use in the development of photographic film embodying two connected annular plates or flanges provided with passages through them permitting the passage of fluid but preventing the direct passage of light.

6. A spool or container for use in the development of photographic film embodying the connected annular plates or flanges, having light-tight fluid passages leading from the inner to the outer sides thereof, and means arranged between the flanges for attaching a film covering and a flexible apron to said spool.

7. The combination with a spool embodying an arbor and flanges at the ends provided with light-tight fluid passages extending through them, of a flexible apron having raised edges and means for attaching one end to the arbor.

8. The combination with a spool embodying an arbor, and flanges at the ends one of which is provided with a light-tight fluid passage, of a flexible apron adapted to be wound on the arbor and means for attaching it thereto.

9. A spool or container for film development embodying the arbor, the flanges at the ends thereof having the channels and apertures, the plates arranged inside the flanges and means arranged between the flanges for engaging a film covering.

10. A film spool or container embodying the hollow arbor, the wide protecting flanges at the ends having indirect fluid passages therein, the bearing flanges located on the arbor and the hooks thereon.

11. A film spool or container embodying the hollow arbor, the flanges at the ends having the indirect passages therethrough and the hooks and bail on the arbor.

12. A film spool or container embodying the hollow arbor, the flanges on the ends of the arbor having the indirect passages therein, the plates on the arbor having the hooks, and the bail extending longitudinally of the arbor and having its end extended through the arbor to form an operating pin.

13. The combination with a spool embodying an arbor having flanges at the ends and grooves in one of said flanges communicating with the exterior of the spool, of connected flexible film separating strips having passages therein and adapted to be attached to the arbor and to be wound upon the spool in proximity to the flanges thereof.

14. The combination with the spool having flanges at the ends and radially-extending channels, of a flexible film separating strip adapted to be wound upon the spool having passages adjacent the flanges.

15. The combination with the spool having flanges and indirect passages from the inner to the outer sides thereof, of a flexible apron having separated projections at the edges and adapted to be wound upon the spool.

16. In an apparatus for developing photographic film the combination with a casing having a removable cover, a film holder therein and a removable arbor, of a spool or container having wide protecting flanges at the ends, means for supporting and rotating said spool within the casing and a flexible apron having projections at the edges and means for attaching its ends to the spool and arbor respectively.

17. In an apparatus for developing photographic film, the combination with a casing having bearings in the sides, a removable cover and a film holder in the casing, of a shaft mounted in the casing, a removable spool embodying an arbor having wide protecting flanges at the ends, a removable spindle for said spool, a flexible separating apron and means for detachably connecting it with the spool and shaft.

18. In an apparatus for developing photographic film, the combination with a casing having a removable cover, of a shaft in the casing, a spool mounted removably in the casing and having wide protecting flanges, connected film separating strips having passages therein and means for attaching opposite ends of said strips to the shaft and spool.

19. The combination with the film spool having an arbor, and the wide flanges at the ends thereof provided with indirect liquid passages therein, of an apron adapted to be wound on said arbor embodying flexible strips having passages therein.

FREDERICK W. BARNES.

Witnesses:
G. WILLARD RICH,
RUSSELL B. GRIFFITH.